(12) United States Patent
Choi et al.

(10) Patent No.: US 6,978,151 B2
(45) Date of Patent: Dec. 20, 2005

(54) UPDATING PATH LOSS ESTIMATION FOR POWER CONTROL AND LINK ADAPTATION IN IEEE 802.11H WLAN

(75) Inventors: Sunghyun Choi, Montvale, NJ (US); Amjad Ali Soomro, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 649 days.

(21) Appl. No.: 09/974,478

(22) Filed: Oct. 10, 2001

(65) Prior Publication Data

US 2002/0168993 A1 Nov. 14, 2002

Related U.S. Application Data

(60) Provisional application No. 60/290,141, filed on May 10, 2001.

(51) Int. Cl.⁷ .......................... H04B 1/40; H04B 7/185
(52) U.S. Cl. ................. 455/522; 455/63.1; 455/67.11; 455/69; 370/252; 370/318; 370/468
(58) Field of Search .............................. 455/522, 63.1, 455/67.11, 69, 504; 370/455, 252, 318, 465, 370/468; 379/386, 413

(56) References Cited

U.S. PATENT DOCUMENTS

| | | | |
|---|---|---|---|
| 5,383,219 A * | 1/1995 | Wheatley et al. ........... 370/342 |
| 5,446,756 A * | 8/1995 | Mallinckrodt ............... 375/130 |
| 5,553,316 A * | 9/1996 | Diepstraten et al. ........ 370/445 |
| 5,729,557 A * | 3/1998 | Gardner et al. ............. 714/774 |
| 6,067,458 A * | 5/2000 | Chen .......................... 455/522 |
| 6,317,435 B1 * | 11/2001 | Tiedemann et al. ......... 370/441 |
| 6,496,700 B1 * | 12/2002 | Chawla et al. ........... 455/435.2 |
| 6,775,548 B1 * | 8/2004 | Rong et al. ................. 370/468 |
| 6,823,194 B2 * | 11/2004 | Haim ......................... 455/522 |
| 6,898,437 B1 * | 5/2005 | Larsen et al. ............... 455/522 |
| 6,904,021 B2 * | 6/2005 | Belcea ....................... 370/252 |
| 2002/0142788 A1 * | 10/2002 | Chawla et al. .............. 455/504 |
| 2004/0170132 A1 * | 9/2004 | Shin et al. .................. 370/294 |
| 2005/0063356 A1 * | 3/2005 | Larsen et al. ............... 370/351 |

FOREIGN PATENT DOCUMENTS

| WO | WO9907105 | 2/1999 | .......... H04L 12/00 |
|---|---|---|---|
| WO | WO0057575 | 9/2000 | .......... H04B 7/005 |

* cited by examiner

*Primary Examiner*—Binh K. Tieu

(57) ABSTRACT

A method and apparatus for determining the transmission power level between a plurality of stations located within the coverage area of a basic service set (BSS) in a wireless local area network (WLAN). The receiving station measures a received signal power from the transmitting station, then the path loss estimation is computed based on the difference between the received signal power and the transmit power level extracted from the incoming signal. The computed path loss is updated according predetermined criteria. Based on the updated path loss information, the transmit power level and/or the transmission rate of a receiving station is adjusted.

35 Claims, 4 Drawing Sheets

UPDATING PATH LOSS ESTIMATION FOR POWER CONTROL AND LINK ADAPTATION IN IEEE 802.11H WLAN

CROSS REFERENCE TO RELATED APPLICATION

This application claims the benefit of U.S. Provisional Applications Ser. No. 60/290,141 filed May 10, 2001, the teachings of which are incorporated herein by reference.

BACKGROUND OF THE INVENTION

1. Field of the Invention

The present invention relates to communication systems. More particularly, the present invention relates to a system and method for estimating path loss between wireless stations in an IEEE 802.11 wireless local area network (WLAN) and for using this value to more accurately adjust the transmit power level and/or transmission rate of each station.

2. Description of the Invention

In general, there are two variants of wireless local area networks (WLAN): infrastructure-based and ad hoc-type. In the former network, communication typically takes place only between the wireless nodes, called stations (STAY), and the access point (AP), whereas communication takes place between the wireless nodes in the latter network. The stations and the AP, which are within the same radio coverage, are known as a basic service set (BSS).

The IEEE 802.11 standard specifies the medium access control (MAC) and physical characteristics for a wireless local area network (WLAN) to support physical layer units. The IEEE 802.11 standard is defined in International Standard ISO/IEC 8802-11, "Information Technology—Telecommunications and information exchange area networks", 1999 Edition, which is hereby incorporated by reference in its entirety.

Currently, the IEEE 802.11 does not provide any mechanism for providing dynamic transmit power control (TPC) between wireless stations within a BSS. Typically, each 802.11 STA uses a fixed transmission power level for all the frame transmissions throughout its lifetime. However, a new standard, IEEE 802.11h contemplates implementing the dynamic transmit power control (TPC). Accordingly, the present invention provides an improved TPC mechanism that can be implemented within the firmware of the proposed 802.11h MAC implementation without much complexity.

SUMMARY OF THE INVENTION

The present invention is directed to a system and method of estimating path loss by a communication receiver to determine accurate transmission power control (TPC) or to adjust transmission rate in a wireless local area network (WLAN).

According to an aspect of the present invention, a method for determining the transmission power level and/or transmission rate between a plurality of stations located within the coverage area of a basic service set (BSS) in a wireless local area network (WLAN) is provided. The method includes the steps of: measuring total received signal power of an incoming frame; calculating a path loss based on the difference between the measured received signal power and the transmit power level extracted from the incoming frame and adjusting the transmit power level or the transmission rate of the receiving station according to the said calculated path loss.

Another aspect of the present invention provides a method for determining the transmission power level and/or transmission rate between a plurality of stations located within the coverage area of a basic service set (BSS) in a wireless local area network (WLAN), each station having a means for transmitting a signal and a means for receiving a signal. The method includes the steps of: transmitting a first frame from a transmitting station to a receiving station; measuring the receive power level of said received first frame by the receiving station; extracting the transmit power level from the received first frame by the receiving station; calculating a path loss based on the difference between the measured received signal power and the extracted transmit power level from the first frame; and, adjusting the transmit power level and/or the transmission rate of a future frame transmitted by the receiving station based on the calculated path loss information received therein. The path loss information is determined based on the proportionate weight of the calculated path loss information and, one or more, previously calculated path loss information.

Another aspect of the present invention provides an apparatus with a power measurement circuit for determining the transmission power level between a plurality of stations located within the coverage area of a basic service set (BSS) in a wireless local area network (WLAN). The apparatus includes a receiver circuit for demodulating an incoming signal; a power measurement circuit for measuring the received signal power of the incoming signal received therein; a processor, coupled to the power measurement circuit, for calculating path loss information based on the difference between the received signal power and the transmit power level extracted from the incoming frame; a memory, coupled to the processor, for storing the calculated path loss information for a predetermined time period for a subsequent retrieval; and, a transmitter circuit coupled to the processor The foregoing and other features and advantages of the invention will be apparent from the following, more detailed description of preferred embodiments as illustrated in the accompanying drawings in which reference characters refer to the same parts throughout the various views.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

Figure 1:
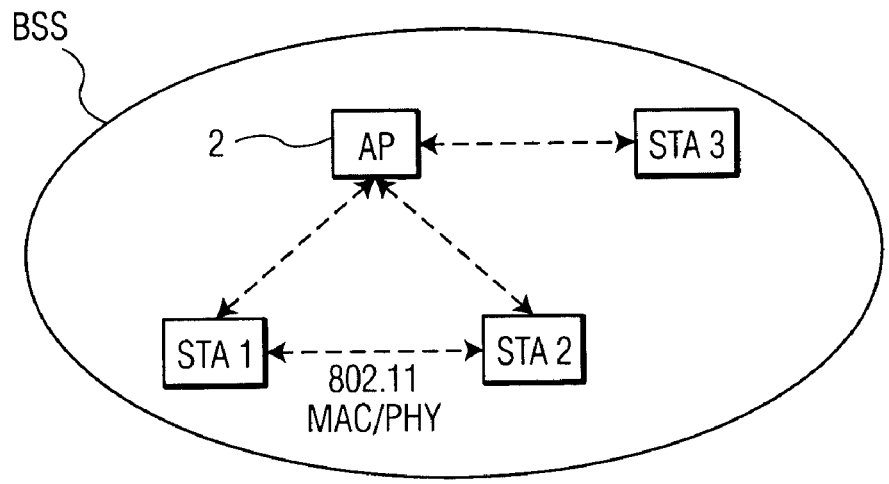
FIG. 1 is a simplified block diagram illustrating the architecture of a wireless communication system whereto embodiments of the present invention are to be applied.

FIG. 1 illustrates a representative network whereto embodiments of the present invention are to be applied. As shown in FIG. 1, an access point (AP) 2 is coupled to a plurality of mobile stations ($STA_i$), which, through a wireless link, are communicating with each other and to the AP via a plurality of wireless channels. A key principle of the present invention is to provide a mechanism to update and estimate the path loss between a transmitting station and a receiving station by the receiving station of a frame. The updated path loss is useful in, but not limited to, saving the battery power, avoiding interference to other systems, adjusting radio coverage and adjusting transmission rate, by transmitting frames at just the right power level and the right transmission rate. IEEE 802.11 Physical Layers (PHYs) define a plurality of transmission rates based different modulations and channel coding schemes so that the transmitter of a frame can choose one of the multiple rates based on the wireless channel condition between the receiver and itself at a particular time. Typically, the lower the transmission rate, the more reliable the transmission. It should be noted that the network shown in FIG. 1 is small for purposes of illustration. In practice most networks would include a much larger number of mobile stations.

Figure 2:
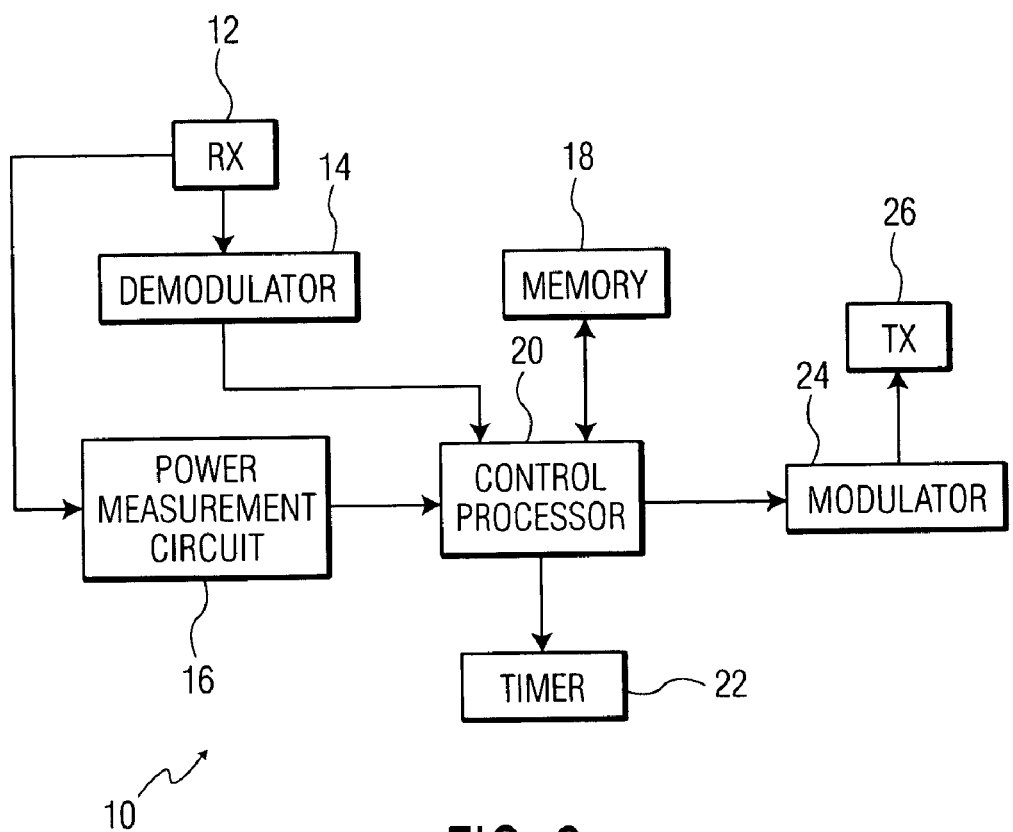
FIG. 2 illustrates a simplified block diagram of an access point and each station within a particular basic service set (BSS) according to the embodiment of the present invention.

Referring to FIG. 2, the AP and each STA within the WLAN of FIG. 1 may include a system with an architecture that is illustrated in the block diagram of FIG. 1. Both the AP and STA may include a receiver 12, a demodulator 14, a power measurement circuit 16, a memory 18, a control processor 20, a timer 22, a modulator 24, and a transmitter 26. The exemplary system 10 of FIG. 2 is for descriptive purposes only. Although the description may refer to terms commonly used in describing particular mobile stations, the description and concepts equally apply to other processing systems, including systems having architectures dissimilar to that shown in FIG. 2.

In operation, the receiver 12 and the transmitter 26 are coupled to an antenna (not shown) to convert received signals and transmit desired data into corresponding digital data via the demodulator 14 and the modulator 24, respectively. The power measurement circuit 16 operates under the control of the processor 20 to determine the path loss by subtracting the received signal strength from the transmission power level (in dBm), which is conveyed in the frame received thereon. The path loss with respect to other stations is estimated and stored in the memory 18 that is coupled to the processor 20 for subsequent retrieval. The estimated path loss with respect to other stations within the same BSS is updated and later used to calculate the transmission power level. The timer 22 is used to eliminate the outdated path loss estimation, which is stored in the memory 18. In the embodiment, the path loss is updated as it tends to change due to the time-varying nature of the wireless channel as well as the potential mobility of WLAN STAs.

Figure 3:
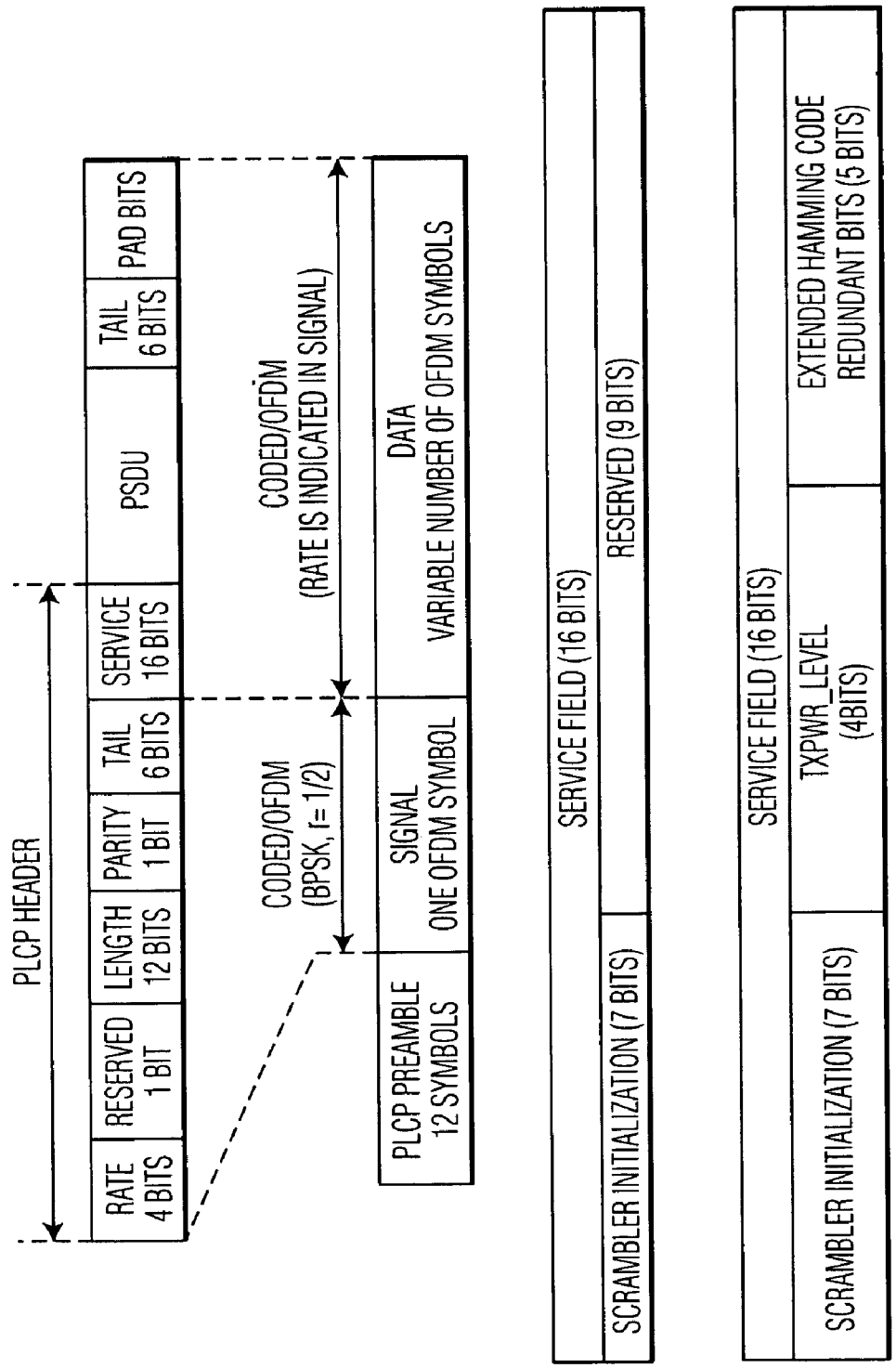
FIG. 3 illustrates the format of an 802.11 frame, including the modification of the SERVICE field, that can be used to transmit information between stations according to an embodiment of the present invention.

FIG. 3 represents the format of PHY Protocol Data Unit (PPDU) frame that is used to convey the transmission power level information between the stations. As shown in the lowest part of FIG. 3, the transmission power level (represented by TXPWR_LEVEL) is transmitted in the SERVICE field of the 802.11a/h PPDU frame. The SERVICE field of the 802.11a is slightly modified to include the four-bit TXPWR_LEVEL field. The original SERVICE field format of 802.11a is found in the middle part of FIG. 3. The TXPWR_LEVEL field is defined from 1 to 16, where each value represents a particular transmission power level. The TXPWR_LEVEL is used to determine the path loss by subtracting the received signal strength via Received Signal Strength Indicator (RSSI) from the transmitted signal power via TXPWR_LEVEL (explained later). After obtaining the path loss by receiving frame(s), the receiving STA can determine both the PHY rates as well as the transmission power intelligently for its future transmission to other STA. Thus, the transmission power level and rate are determined solely up to the transmitting STA's discretion. It should be noted that the transmission power should not exceed the maximum transmission power specified by the AP through a beacon frame; an 802.11h-compliant AP shall broadcast such maximum transmission power via beacon frames periodically. Hence, receiving an erroneous TXPWR_LEVEL, which causes an adverse effect on the system performance, can be avoided. An Extended Hamming Code may be used for the error detection code operation.

Now, the principle of operation steps according to the present invention of updating the path loss to determine the transmission power level is explained hereafter.

Figure 4:
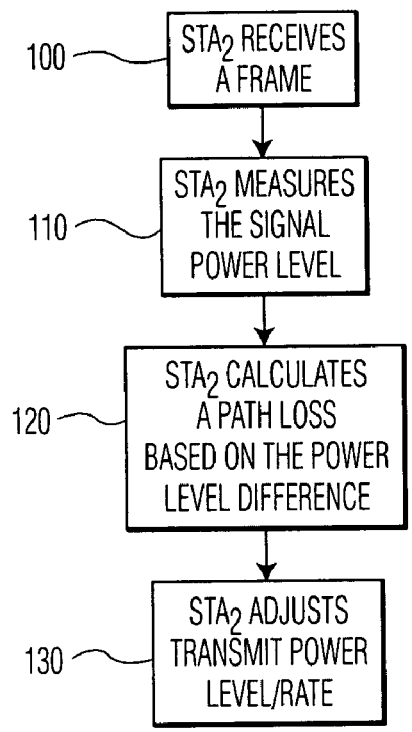
FIG. 4 is a flow chart illustrating the operation steps of selectively adjusting the power level according to an embodiment of the present invention.

Referring to FIG. 4, the inventive process includes the following steps: in step 100, a station STA2 receives a frame. In step 110, the STA2 measures the power level of the received frame. Measuring the power level is a well-known art that can be performed in a variety of ways. In step 120, the STA2 calculates the path loss, which is the difference between the transmitted power level and the received power level, and updates the path loss information. The path loss PL is updated by giving a different weight to the new and old path loss values, as follows: $PL = a1*PL\_new + a2*PL$ ($a1+a2=1$, $a1 \geq 0$, and $a2 \geq 0$), wherein PL_new represents the estimated path loss from the new frame reception. The updated path loss is then used to determine the transmitter power required to obtain the desired carrier-to-noise ratio within the BSS. In step 140, the STA2 adjusts the transmission power level and/or the transmission rate based on the adjustment level that was determined in step 120.

Although a limited number of STAs is shown in FIG. 4 for illustrative purposes, it is to be understood that the WLAN can support communications between a much larger number of STAs. Thus, the number of STAs in the figure should not impose limitations on the scope of the invention. In such event, each STA keeps track of the path loss between other STAs within the BSS and to the AP, then each transmitting station may use the path loss estimation to adjust the transmit power level as it transmits a frame to another STA or to the AP. With non-802.11e WLAN, a STA needs to keep track of the path loss with the AP only as the STA must transmit frames to its AP. Here, each transmitting station may want to keep track of the path loss with a selected number of STAs to reduce the complexity. In addition, to prevent using outdated and stale path loss information, the present invention may adopt the path loss information lifetime. To this end, whenever STA 2 updates the path loss estimation with STA 1 by receiving a frame from STA 1, STA 2 sets a timer for each updated path loss estimation using the timer 22 of FIG. 2. Hence, the STA 2 will compare the most recent updated time of the frame with the current time when it is to transmit a frame.

Figure 5:
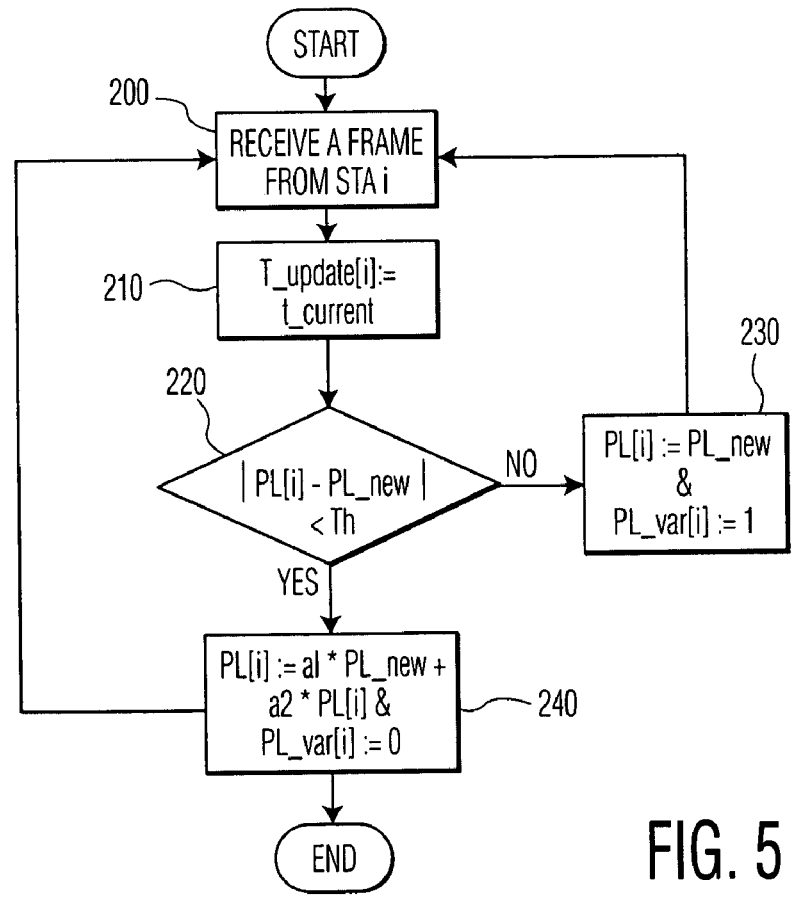
FIG. 5 is a flow chart illustrating the operation steps of updating path loss per frame reception according to an embodiment of the present invention; and, FIG. 6 is a flow chart illustrating the operation steps of updating path loss prior to a frame transmission according to an embodiment of the present invention.

FIG. 5 illustrates the principles of updating the path loss adjusting the transmission power level and/or the transmission rate of a frame. In step 200, upon receiving a frame from another station in step 200, the newly estimated path loss is calculated and updated in step 220. Thereafter, the new path loss estimation is compared to determine whether it is different from the previously stored path loss estimation by more than the threshold in step 220. If so, the receiving station will calculate the path loss according to a particular condition (PL=a1*PL_new+a2*PL, wherein a1+a2=1, a1≧0, and a2≧0) in step 240 and will reset the flag PL_var=0. Otherwise, the receiving station will erase the old path loss information and store the new information by setting the flag PL_var=1, which indicates a change in the path loss information in step 230. Thereafter, the STA 2 will use the stored path loss information received from the STA 1 only if the lifetime of the path loss does not pass the preset threshold and only when PL_var=0. This same method could be used to update path information between AP and a STA. Also, the same method could be used by AP to update path loss information to the STAs.

Figure 6:
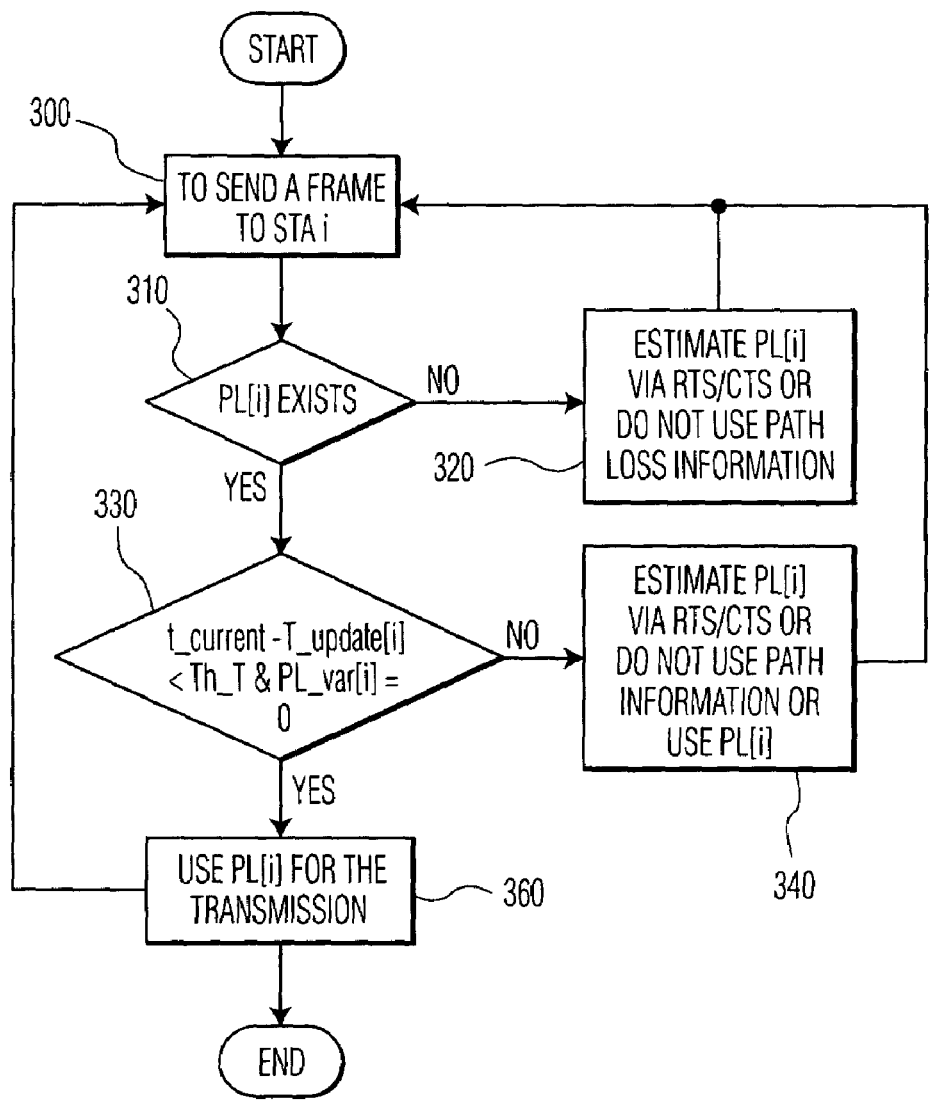

FIG. 6 illustrates the operation steps of using the path loss information by the transmitting station. To transmit a frame to another station in step 300, it is determined whether the path loss estimation that is received from the receiving station exists in step 310. If so, it is determined whether the time of the path loss estimation and current time is less than the preset threshold in step 330. Otherwise, a new estimation of path loss may be performed via a Request-to-Send (RTS)/Clear-to-Send (CTS) frame exchange. The CTS/RTS frame can measure the path loss without service interruption. The transmitting station could measure the path loss by sending an RTS frame to the supposed receiving STA and receiving the corresponding CTS frame from the said receiving STA. Note that the CTS frame shall include the transmission power level in its SERVICE field as well so that the sender of the RTS frame can estimate the path loss. Alternatively, the transmitting station may use the maximum power level announced by the AP within the BSS via a beacon frame for its frame transmission in step 320. If the difference is less than the preset threshold and PL_var=0, the station uses the path loss estimation found in step 310. If the difference is not less than the preset threshold in step 330, a new estimation of path loss is performed via RTS/CTS, or the station may use the maximum power level announced by the AP within the BSS via the beacon frame in step 340.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for determining the transmission power level among a plurality of stations located within the coverage area of a basic service set (BSS) in a wireless local area network (WLAN), comprising the steps of:
   measuring received signal power of an incoming frame by a receiving station;
   calculating a path loss based on a difference between said measured received signal power and a transmit power level extracted from said incoming frame by said receiving station;
   determining a path loss based on the calculated path loss, a previous path loss and a threshold value;
   adjusting the transmit power level of said receiving station based on the the determined path loss; and;
   adjusting the transmission rate of said receiving station based on the determined path loss.

2. The method of claim 1, wherein said step of adjusting the transmit power level of said receiving station is performed if the difference of said calculated path loss and the previous path loss is less than the threshold.

3. The method of claim 1, wherein said step of adjusting the transmission rate of said receiving station is performed if the difference in said calculated path loss and the previous path loss is less than the threshold.

4. The method of claim 1, further comprising the step of storing said calculated path loss in a memory medium for a predetermined time period.

5. The method of claim 4, further comprising the steps of:
   updating said calculated path loss by comparing said calculated path loss information to the threshold; and,
   deleting said calculated path loss from said memory medium if the lifetime of said path loss is longer than said threshold.

6. The method of claim 1, wherein said incoming frame is transmitted by an access point (AP) located within said basic service set (BSS).

7. The method of claim 1, wherein said incoming frame is transmitted by a transmitting station located within said basic service set (BSS).

8. The method of claim 1, wherein said receiving station is an access point (AP) located within said basic service set (BSS).

9. The method of claim 1, wherein said receiving station is a mobile unit located within said basic service set (BSS).

10. A method for determining the transmission power level among a plurality of stations located within the coverage area of a basic service set (BSS) in a wireless local area network (WLAN), each station having means for transmitting a frame and means for receiving a frame, the method comprising the steps of:
    transmitting a first frame from a transmitting station to a receiving station;
    measuring, at said receiving station, a received power level of said received first frame;
    extracting, at said receiving station, a transmit power level from said received first frame;
    calculating path loss information based on a difference between said measured received signal power and said extracted transmit power level from said first frame;
    adjusting, at said receiving station, the transmit power level of a future frame transmitted from said receiving station based on the difference in said calculated path loss and a previous calculated path loss and a threshold value; and
    adjusting the transmission rate of said second signal transmitted based on the difference in said calculated path loss and a previous calculated path loss and a threshold value.

11. The method of claim 10, wherein said step of calculating said new transmit power level comprises the steps of:
    comparing the difference between said calculated path loss information and the previous path loss to the threshold; and, updating the path loss information differently based on whether the difference in said calculated path loss and the previous path loss information exceeds said threshold.

12. The method of claim 10, wherein said step of adjusting the transmit power level of said receiving station is performed if the difference in said calculated path loss and previous path loss information is less than a threshold.

13. The method of claim 10, further comprising the step of storing said calculated path loss information in a memory medium for a predetermined time period.

14. The method of claim 10, wherein said step of adjusting the transmission rate of said receiving station is performed if the difference in said calculated path loss and the previous path loss information is less than the threshold.

15. The method of claim 14, further comprising the step of storing said calculated path loss information in a memory medium if said path loss information exceeds said threshold.

16. The method of claim 10, wherein said first frame is transmitted by an access point (AP) located within said basic service set (BSS).

17. The method of claim 10, wherein said first frame is transmitted by a mobile unit.

18. The method of claim 10, wherein said receiving station and said transmitting station are a mobile unit.

19. An apparatus having a power measurement circuit for determining the transmission power level between a plurality of stations located within the coverage area of a basic service set (BSS) in a wireless local area network (WLAN), comprising:
   a receiver circuit for demodulating an incoming signal;
   a power measurement circuit for measuring received signal power of said incoming signal received therein;
   a processor, coupled to said power measurement circuit, for calculating path loss information based on a difference between said received signal power and a transmit power level extracted from said incoming signal;
   a memory, coupled to said processor, for storing said calculated path loss information for a subsequent retrieval;
   wherein said processor determines a new transmission rate based on whether difference in said calculated path loss and a path loss information stored in said memory exceeds a threshold.

20. The apparatus of claim 19, wherein said transmitter comprises a modulator for modulating signals indicative of said stored path loss information.

21. The apparatus of claim 19, wherein said calculated path loss information is stored in said memory.

22. The apparatus of claim 19, wherein said incoming signal is transmitted by an access point (AP) located within said basic service set (BSS).

23. The apparatus of claim 19, wherein said incoming signal is transmitted by a transmitting station.

24. The apparatus of claim 19, wherein said incoming signal is transmitted by a transmitting station located within said basic service set (BSS).

25. An apparatus having a power measurement circuit for determining the transmission power level between a plurality of stations located within the coverage area of a basic service set (BSS) in a wireless local area network (WLAN), comprising:
   means for receiving an incoming signal;
   means for demodulating said incoming signal;
   means for measuring received signal power of said incoming signals received therein;
   means for calculating path loss information based on a difference between said measured received signal power and a transmit power level extracted from incoming signals;
   means for storing said calculated path loss information for a subsequent retrieval; and
   means for determining a new transmission rate based on whether a difference in said calculated path loss and a previous calculated path loss information exceeds a threshold.

26. The apparatus of claim 25, further comprising a means for adjusting the transmit power level of said receiving station.

27. The apparatus of claim 25, further comprising a means for adjusting the transmission rate of said receiving station.

28. The apparatus of claim 25, further comprising a means for modulating signals indicative of said stored path loss information.

29. The apparatus of claim 25, wherein said calculated path loss information is stored in said storing means for a predetermined time period.

30. The apparatus of claim 25, wherein said incoming signal is transmitted by an access point (AP) located within said basic service set (BSS).

31. The apparatus of claim 25, wherein said incoming signal is transmitted by a transmitting station located within said basic service set (BSS).

32. The apparatus of claim 25, wherein said processing means calculates said path loss information in response to said received signal power and said transmitted power level.

33. The apparatus of claim 25, further comprising a means for determining a new transmit power level based on whether the difference in said calculated path loss and a previous calculated path loss information exceeds the threshold.

34. The apparatus of claim 25, further comprising a means for updating said calculated path loss information based on whether the difference in said calculated path loss and a previous calculated path loss information exceeds a threshold.

35. The apparatus of claim 25, wherein said path loss information is calculated based on the proportionate weight of said calculated path loss information and the previous calculated path loss information if the difference in said calculated path loss and a previous calculated path loss information does not exceed said threshold.

* * * * *